Sept. 13, 1927.

E. R. BORN

SHOCKING TONGS

Filed May 3, 1926

1,642,639

E. R. Born
INVENTOR

BY Victor J. Evans
ATTORNEY

Patented Sept. 13, 1927.

1,642,639

UNITED STATES PATENT OFFICE.

ERNEST R. BORN, OF HENSEL, NORTH DAKOTA.

SHOCKING TONGS.

Application filed May 3, 1926. Serial No. 106,523.

My present invention has reference to a hand operated device for shocking bundles of grain, feed, etc. In shocking grain by hand, the operator must employ gloves, but even these articles do not offer full protection to the fingers of the operator as the bundles of grain are frequently filled with thistles and other growths which tear the gloves and inflict injury to the hands of the operator. It may, therefore, be considered the primary object of this invention to produce shocking tongs which may be conveniently held in the hands of the operator and by virtue of the grip of the operator's hand thereon will actuate pairs of tines to bring the same in gripping engagement with the bundles of grain so that such bundles may be shocked in an easy and expeditious manner and without liability of injury to the operator.

To the attainment of the foregoing the improvement further resides in certain novel features of construction, combination and operative association of parts, a satisfactory embodiment of which is illustrated by the drawings which accompany and form part of this application.

Figure 1:
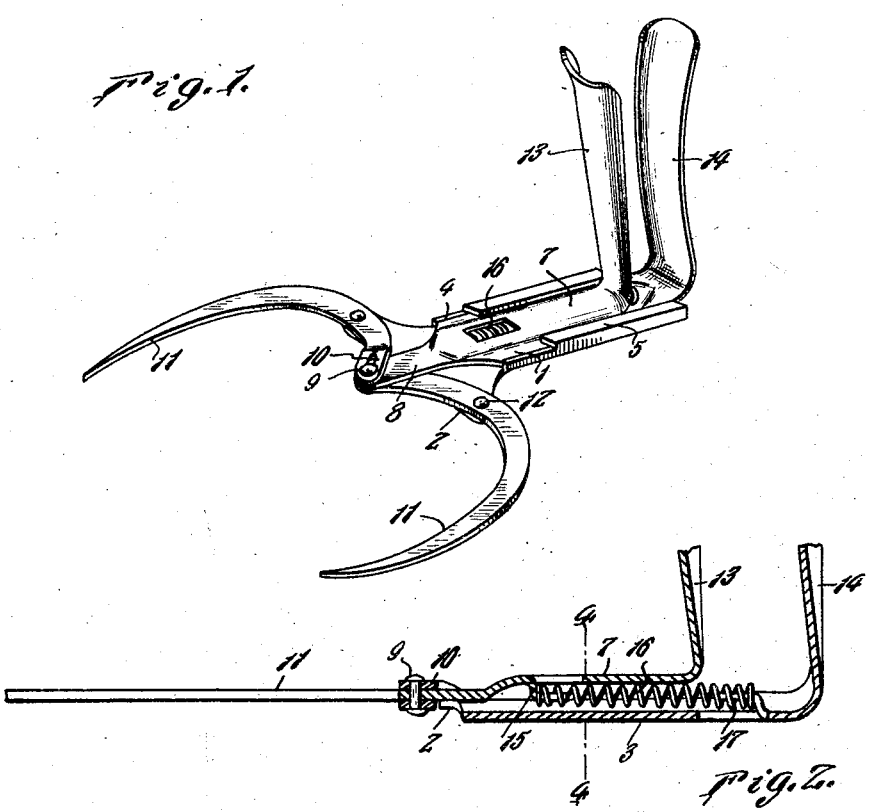
Figure 1 is a perspective view of a shocking tongs in accordance with this invention.
Figure 2:
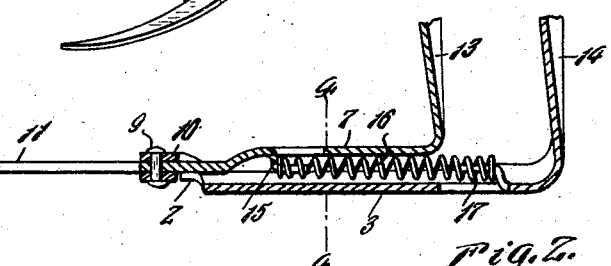
Figure 2 is an approximately central longitudinal sectional view therethrough.
Figure 3:
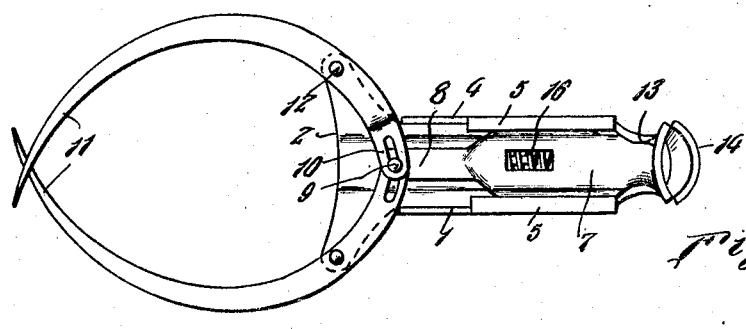
Figure 3 is a top plan view thereof.
Figure 4:
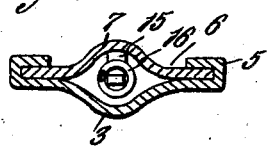
Figure 4 is a section on the line 4—4 of Figure 2.

Two pair of tongs are employed, one gripped in each hand of the operator, but in the showing of the showing of the drawings I have illustrated only one of such constructions.

Referring now to the drawings in detail, the numeral 1 designates a plate that has a widened end 2. The plate, at the center thereof, has its outer face depressed longitudinally, as at 3. The straight edges of the plate 1, for a suitable distance from the widened end 2 thereof, is flanged upwardly as at 4, and these flanges at the rear or outer portion of the plate, are bent inwardly, as at 5. The upstanding flanges 4 and the overlying flanges 5 provide guide-ways for the straight ends 6 of a centrally arched plate 7. The plate 7 has one of its ends flattened, reduced, and extended, as at 8, to provide what may be termed a tongue and through this tongue there passes a headed pivot 9 that also passes through somewhat elongated slots 10 in the inner ends of the curved tines 11. These tines are pivoted as at 12, to the ends of the laterally extending or widened portion 2 of the plate 1. The opposite ends of both the plates 7 and 1 are bent upwardly to provide handles 13 and 14, respectively. These handles are preferably curved cross sectionally in opposite directions. The arched body portion of the plate 7 is slitted longitudinally and transversely and the metal bounded by these slits is bent downwardly to provide a substantially U-shaped tongue 15 that is received in one end of a convolute spring 16. In a like manner the central portion of the plate 1, inward of its handle 4, is slitted longitudinally and transversely and the metal bounded by said slit is bent to provide a tongue 17 that is received in the second end convolutions of the spring 16.

It is to be noted that both of the plates of the device are so associated as to prevent the entrance of extraneous matter therebetween and that the spring 16 is effectively housed between said plates. The stationary handle 14 and the movable handle 13 are gripped by the operator. A pressure exerted upon the handle 13 will move the plate 7 toward the handle end of the plate 1, thus drawing on the straight end 8 of the said plate 7 and causing the tines 11 to be swung upon their pivots 12. By forming the tines with the somewhat elongated slots 10 a binding between the tines and the pivot 9 is thus prevented. The spring 16 is comparatively light so that no strain is exerted by the operator in using the device. As previously stated, two of these devices are employed and it will be apparent to those skilled in the art to which this invention relates that bundles of grain may be easily, expeditiously and effectively shocked without liability of injury to the hands of the operator.

Having described the invention, I claim:

A fork adapted for use in shocking grain by hand, comprising a plate having one of its ends widened and its opposite end centrally formed with an angularly arranged handle, the central portion of the plate, between the handle and the said widened portion being concaved longitudinally from the inner face thereof, and the straight edges of the plate being flanged in the direction of the handle for a determined distance and then formed with inwardly directed over lying flanges, a second plate having straight edges which are slidable between the flanges of the first mentioned plate, said plate having its body portion centrally rounded outwardly, one of its ends providing a handle which is formed with an angle end disposed opposite the first mentioned handle and its second end reduced and extending over but out of contact with the widened end of the first mentioned plate, tines pivoted respectively to the outer corners of the widened end of the first mentioned plate and loosely pivoted to the reduced extension of the last mentioned plate and a spring received in the arched portions of the plates and exerting a tension between said plates.

In testimony whereof I affix my signature.

ERNEST R. BORN.